Aug. 11, 1964 C. S. ABRAHAM 3,143,778

COVERED SLIDE FASTENER

Filed June 11, 1959 5 Sheets-Sheet 1

INVENTOR.
Carlos Salomon Abraham

BY
Michael S. Striker

ATTORNEY

Aug. 11, 1964 C. S. ABRAHAM 3,143,778

COVERED SLIDE FASTENER

Filed June 11, 1959 5 Sheets-Sheet 2

INVENTOR.
Carlos Salomon Abraham

BY
Michael S. Striker

ATTORNEY

INVENTOR.
Carlos Salomon Abraham
BY
Michael S. Striker
ATTORNEY

Aug. 11, 1964 C. S. ABRAHAM 3,143,778

COVERED SLIDE FASTENER

Filed June 11, 1959 5 Sheets-Sheet 4

INVENTOR.
Carlos Salomon Abraham
BY
Michael S. Striker
ATTORNEY

Aug. 11, 1964 C. S. ABRAHAM 3,143,778

COVERED SLIDE FASTENER

Filed June 11, 1959 5 Sheets-Sheet 5

INVENTOR.

Carlos Salomon Abraham

BY

Michael S. Striker

ATTORNEY

United States Patent Office 3,143,778

Patented Aug. 11, 1964

3,143,778

COVERED SLIDE FASTENER

Carlos Salomon Abraham, Republica de Chile 43–46A, Mexico City, Mexico

Filed June 11, 1959, Ser. No. 819,600
Claims priority, application Mexico June 10, 1958
3 Claims. (Cl. 24—205.1)

The present invention relates to slide fasteners in general, and more particularly to improvements in stringers having covers for concealing one or both sides of the scoops.

This application is a continuation-in-part of my application Serial No. 783,542, filed on December 29, 1958, now abandoned.

A serious drawback of presently known slide fasteners, when utilized on certain types of clothing or fabrics, such as drapes and the like, is in that they frequently render the articles unsightly or in that they do not appear to belong there. Thus, in certain styles of ladies' apparel manufactured in limitation of various national costumes, e.g. Indian or Pakistani saris, Japanese kimonos, Chinese high-neck, split-skirt dresses, etc., a readily detectable slide fastener appears to be completely out of place and reduces the impression of genuineness which the garment normally intends to convey. Similarly, when used in curtains, draperies, pillow cases and other textile products, the presence of a slide fastener holding, for example, the curtains or drapes in closed position, appears incongruous as it differs in color from its surroundings and reveals the lines along which the various parts are connected to each other. Even on clothing where the readily detectable presence of a slide fastener is immaterial, the metallic scoops tend to impart a cold feeling to the skin so that a cover or lining, at least on such portions of a slide fastener which are in actual contact with the skin, is always desirable. Moreover, a cover applied against the outer sides of the scoops will protect same against rain and will prevent water from penetrating between the stringers of the slide fastener into contact with the skin or with the undergarments. In addition, a slider running over the scoops applied to the edges of both stringers usually produces at least some noise when drawn in the one or the other direction, either to separate the stringers from or to connect same with each other.

A further serious drawback of slide fasteners having stringers with fully exposed scoops is in that the scoops may cut into the skin and may extract hair when permitted to come into direct contact with the human body. Last but not least, when utilizing a slide fastener consisting of stringers with exposed scoops, the danger that a foreign body will penetrate between the scoops is always present, this resulting in jamming of the slider, in damage to the stringers, and in destruction of the entrapped material especially if it is a textile substance forming part of a garment or the like.

Attempts have been made to conceal the scoops of stringers in slide fasteners with a lining or covering but, through some of such covering means and methods of applying same to the stringers have met with limited success for certain specific purposes, none of the prior attempts as far as I am aware have been successful to the extent which would warrant the production of such slide fasteners on a commercial scale.

An important object of the present invention is to provide a cover or lining at least at one side of the scoops in stringers forming parts of slide fasteners which completely conceals the scoops at least at such times when the stringers are coupled with each other.

Another object of the invention is to provide a slide fastener whose stringers are combined with a cover or lining for concealing at least one side of the scoops to thus prevent direct contact of the scoops with the human body and to reduce the possibility that a foreign body may enter between the scoops when the stringers are uncoupled from each other.

A further object of the invention is to provide a practically noiseless slide fastener.

A still further object of the instant invention is to provide a slide fastener of the above outlined characteristics in which both sides of the scoops on each stringer are concealed by a single layer of flexible material.

A yet further object of the invention is to provide a slide fastener in which the one or the other side of the scoops on each stringer may be concealed by separate layers of flexible material.

Still another object of the present invention is to provide a slide fastener of the type as above set forth whose flexibility is not or only slightly reduced despite the presence of one or more covers or layers for concealing at least one side of the scoops.

An additional object of the invention is to provide a cover for concealing both sides of scoops on the stringers of slide fasteners which cannot be separated from the stringers without prior removal of the scoops.

Still another object of the invention is to provide a cover for both sides of scoops on the stringers of slide fasteners which occupies little space and which is not readily detectable when a so constructed slide fastener is in actual use.

A further object of the invention is to provide an improved slider for coupling and uncoupling of the novel stringers.

A concomitant object of the present invention is to provide a method of attaching one or more covers to each stringer of a slide fastener in order to conceal at least one side of the scoops.

Other important objects of the invention are to provide a simple and inexpensive cover for concealing the scoops on stringers of slide fasteners which may be applied to the stringers in a simple and convenient manner without unduly raising the production costs; to provide a slide fastener whose scoops are concealed when the stringers are fully or partly coupled with each other; to provide a slide fastener in which the scoops are nearly fully concealed even if the stringers are completely separated from each other; to provide a slide fastener whose scoops may be concealed in such manner that the concealing cover or covers will actually contribute to the resistance against wear and will prevent damage to the scoops; and to provide a slide fastener whose appearance is pleasing to the eye, which may be manufactured in sizes of any desired length, and which completely conceals its scoops regardless of the specific configuration of the scoops.

It has now been discovered that the above objects may be attained by the provision of a cover or layer which extends close to or all the way up to the tips of the scoops at one or both sides of the tapes on which the scoops are mounted so that the covers applied to both stringers of a slide fastener will completely conceal the scoops at least when the latter are in actual engagement with each other, only a thin line of contact between the adjacent longitudinal edges of both layers or covers being visible when a so constructed slide fastener is in stringer-retaining position, i.e. when the scoops on its stringers are caused to intermesh upon movements of the slider in the one or the other longitudinal direction of the slide fastener. By utilizing materials of proper texture, even the aforementioned thin line indicating the adjacent edges of the covers will become practically invisible from a distance of only a few feet.

More particularly the novel stringer comprises a tape with a row of spaced scoops applied over and in certain instances secured directly to one of its edges, each scoop having a forward portion extending beyond the edge of the tape; at least one cover member which has at least one edge adjacent to the forward portions of the scoops and extends along the scoops toward and into contact with at least one flat side of the tape; and a number of stitches for securing each cover member to the tape and for holding selected portion or portions of each cover member against at least one side of the scoops. The stringer may be formed with a single cover member which conceals only one side of its scoops or which may be folded in half and applied over the forward edge of the tape before the scoops are applied thereto. In the latter case, the scoops are still applied over the edge of the tape but are actually secured to the cover member whose halves are again folded over themselves to be secured to each other by stitches for holding same against the opposing sides of the scoops, the stitches passing through at least some of the spaces between the forward portions of the scoops.

Alternately, the stringer may comprise two distinct cover members each applied to the opopsing sides of the tape, the cover members are then secured to each other by at least one row of stitches passing through some or all spaces between the forward portions of the scoops. Each cover member is folded over itself to form an edge or fold extending along the forward portions of the scoops and is again secured to the tape by at least one row of stitches. It is preferred to connect the free edges of folded over portions of both covers to the rear edge of the tape by at least one row of zig-zag or like stitches.

In the event that the stringer comprises a cover member which conceals only one side of its scoops or two cover members each of which conceals only one side of the scoops, a specially constructed slider is utilized to alternately couple or uncouple a pair of so constructed complementary stringers. The slider is formed with a pair of shells or wings each having two lateral flanges which extend therefrom at obtuse angles when both sides of the scoops are concealed by separate covers. In the event that a single cover member is utilized to conceal only one side of the scoops, the flanges of that shell or wing which moves along the cover member are inclined through more than 90 degrees while the other pair of flanges may extend at right angles or even at an acute angle from the lateral edges of their respective shell.

The cover member or members may be cut along the bias to increase the flexibility and elasticity of a so constructed stringer.

If desired, the forward edge of the tape which is received between the bifurcated rear portions of the scoops may be reinforced by one or two layers or beads of flexible material, or by one or more threads secured thereto by a sewing machine or the like.

The novel features which are considered as characteristic for the invention are set forth in particular in the appended claims. The invention itself, however, both as to its construction and its method of operation, together with additional objects and advantages thereof, will be best understood from the following description of certain specific embodiments when read in connection with the accompanying drawings, in which:

From the foregoing short description of the drawings, it will be readily apparent that three distinct embodiments of stringers are contemplated by the present invention. According to one embodiment which is shown in FIGS. 1 to 7, each side of a row of scoops is concealed by a separate cover member. According to the embodiment shown in FIGS. 8 to 12, only one side of each row of scoops is concealed by a cover member. FIGS. 13 to 26 illustrate a further embodiment according to which a single cover member conceals both sides of the scoops on a stringer.

Figures 1, 2, 3:
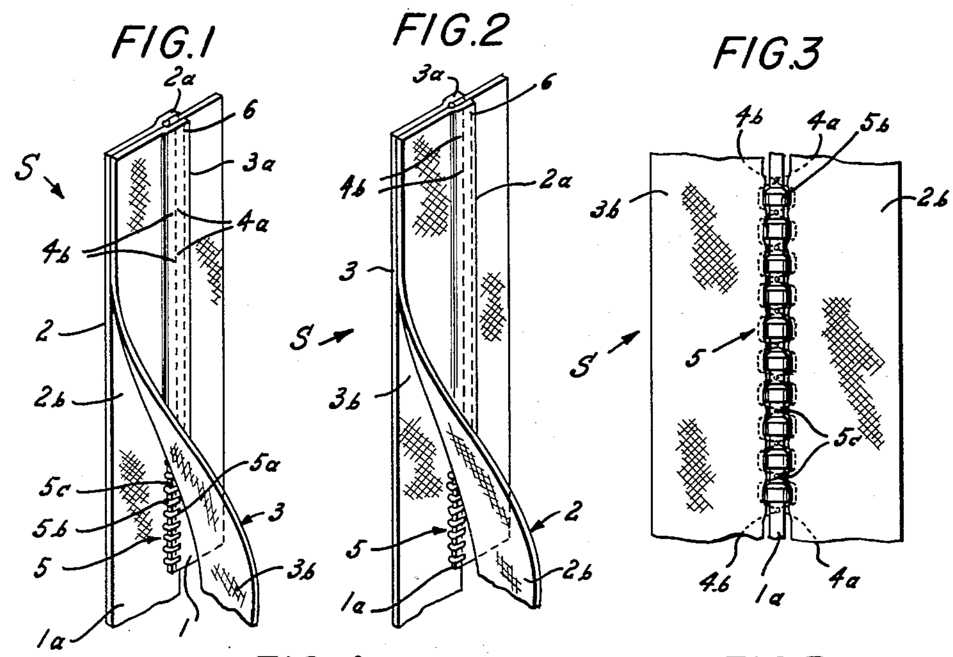
FIG. 1 is a perspective view illustrative of an intermediate stage in the assembling of a stringer having a row of scoops attached directly to the forward edge of its tape and two cover members secured to the opposing flat sides of the tape and to the scoops, one cover member being shown partly folded away to reveal the scoops.
FIG. 2 is a similar perspective view of the stringer turned upside down with the other cover member folded away to reveal the scoops.
FIG. 3 is a somewhat enlarged front elevational view of the partly assembled stringer with the major portions of both cover members folded away into positions substantially at right angles to the plane of the tape, and further showing in broken lines two rows of interlocking stitches which connect the cover members to each other and hold same against the opposing sides of the scoops.

Referring now in greater detail to the illustrated embodiments, and first to that shown in FIGS. 1 to 7, the partly assembled stringer S shown in FIGS. 1 and 2 comprises a tape 1 of textile, plastic or other flexible material having a row of uniformly spaced scoops 5 applied over and secured directly to its forward or front longitudinal edge **1*a* in a manner well known in the art which forms no part of my invention. Edge 1*a* may be reinforced by one or more beads, if desired. Each scoop 5 has a rear portion 5*a* which is bifurcated and receives between its prongs or legs the forward edge 1*a* of the tape 1, and a cupped forward portion 5*b*** which is adapted to engage with a similar forward portion of the scoop forming part of a complementary stringer.

The stringer S further comprises two cover members, i.e., a top cover member 2 and a bottom cover member 3. In the first step of assembling the tape 1 with the cover members 2, 3, the latter are secured to the tape, preferably by a single row of stitches or seams 6 adjacent to and extending along the rear portions **5*a* of scoops 5. Stitches 6 are closely adjacent to the rear longitudinal free edges 2*a*, 3*a* of cover members 2, 3, respectively. Two additional rows of interlocking stitches 4*a*, 4*b* are then applied to cover members 2, 3, these stitches passing through and interlocking in the spaces or gaps 5*c* formed between the adjacent forward portions 5*b* of spaced scoops 5, as is best shown in FIG. 3. Interlocking stitches 4*a*, 4*b* hold the cover members against the opposing sides of the scoops 5 at a point close to the latter's forward portions 5*b*, the covers 2 and 3 thus forming a channel in which the scoops are received in such manner that the side of each scoop is fully concealed by the material of the cover members. The cover members 2, 3** may, but need not, be of the same material as that of the tape; thus, they may be of a textile fabric, leather, plastic, or they may even form part of the article in connection with which the slide fastener is to be utilized, e.g., they may form part of articles of wearing apparel, draperies, curtains, pillow cases and so forth.

In most cases, the color, material and dimensions of both cover members 2 and 3 are identical; thus, it is of no importance which of members 2, 3 is the top or the bottom cover. However, in some specific instances, especially when the cover members 2, 3 are made of leather or certain types of fabric, it is essential that a certain side (hereinafter referred to as the "outer side" or the "outer face") be on the outside of the article in which a so constructed slide fastener is used, and that the other side (hereinafter called the "inner side" or the "inner face") be on the inside of the article.

In applying the row of stitches 6, the cover members 2, 3 are aligned, straight edge to straight edge, but with those major surfaces which should be seen when the stringer S is fully assembled facing each other, i.e. the outer sides **2*b*, 3*b* should be placed adjacent to each other as is shown in FIGS. 1 and 2. The scoops 5 may be fastened to the forward edge 1*a* of tape 1 before or after securing the cover members 2, 3 to the tape by the aforementioned row or rows of stitches or seams 6. The free rear edges 2*a*, 3*a* of both cover members extend slightly beyond the rear portions 5*a* of scoops 5 sufficiently to provide room for application of stitches 6. In the next step, interlocking stitches 4*a*, 4*b* are formed to connect the covers 2, 3 to each other and to hold same against the opposing sides of the scoops by passing through the spaces 5*c* between the adjacent scoops 5 but not through the tape 1. It is preferred, though not absolutely necessary, that the stitches 4*a*, 4*b* pass through each and every one of the spaces 5*c*. Stitches 4*a*, 4*b* and 6, in addition to securing cover members 2, 3 to each other and to the tape 1, at the same time securely hold the scoops 5** in desired spaced relationship. These stitches may be formed by utilizing conventional sewing machines having means for accurately adjusting the length and spacing of stitches.

Figures 4, 5, 6:
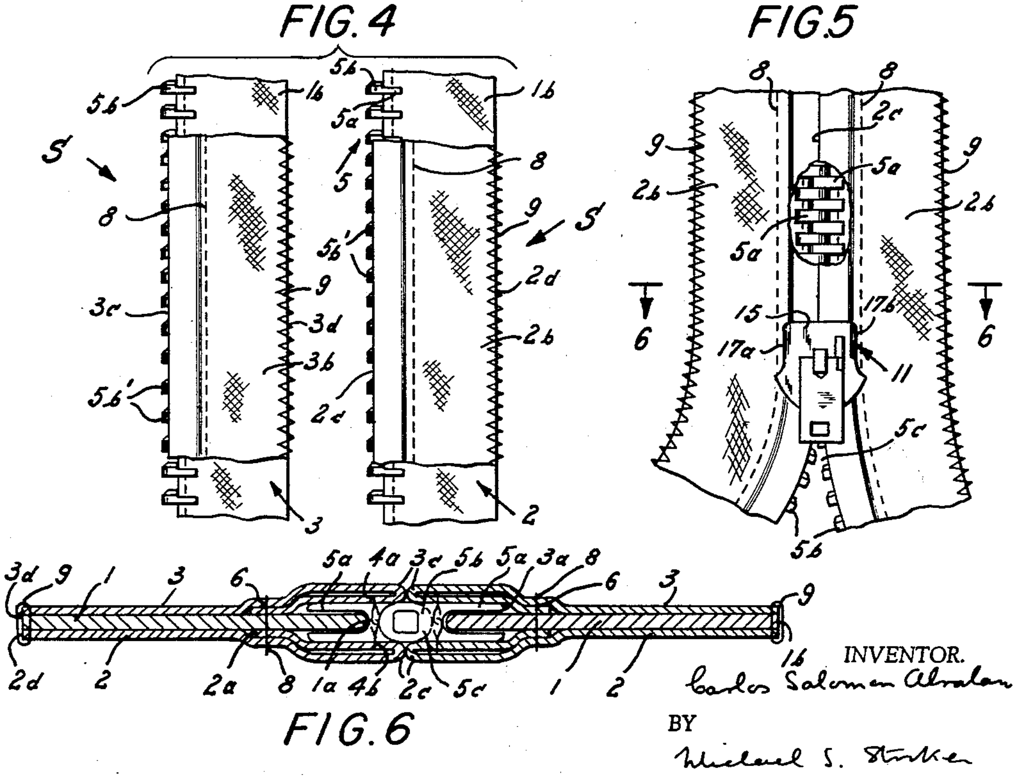
FIG. 4 shows in two side elevational views the opposing sides of the fully assembled stringer with the cover members folded over themselves and secured to an intermediate zone as well as to the rear edge of the tape.
FIG. 5 is front elevational view of a fully assembled slide fastener with two complementary stringers similar to the one shown in FIG. 4 partially coupled with each other by a novel slider, certain portions of the front cover members being broken away to reveal the intermeshing scoops.
FIG. 6 is a greatly enlarged transverse section through the slide fastener taken on the line 6—6 of FIG. 5, as seen in the direction of arrows.

The finishing steps in assembling of a stringer S are shown in FIG. 4. Thus, the cover members 2, 3 are folded or bent over themselves in a manner to form a forward edge or fold **2*c*, 3*c*, respectively, close to the projecting forward or front ends 5*b*' of scoop portions 5*b* i.e. only a small zone of each forward portion 5*b* remains visible when the stringer S is observed from the one or the other side. The folds or forward edges 2*c*, 3*c* of covers 2, 3, respectively, are preferably formed in close proximity of the stitches or seams 4*a*, 4*b*, and the covers are thereupon secured to the opposing flat sides of tape 1 by a further line or row of stitches 8 adjacent to the rear portions 5*a* of the scoops, as well as by an additional seam 9 which connects the free longitudinal edges 2*d*, 3*d* of respective covers to the rear edge 1*b* of tape 1. This moves the outer sides or faces 2*b*, 3*b* of the covers to the outside, i.e. these faces become visible when the stringer S is fully assembled. It is often preferred to align or overlap the row of stitches 8 with the seams 6, i.e. to utilize the same holes for both rows of stitches. This is shown in FIG. 6. Stitches 9 which secure the free edges 2*d*, 3*d* of the covers to the rear edge 1*b*** of the tape are preferably though not necessarily of the so-called zig-zag type, as is shown in FIG. 5.

A fully assembled stringer S thus comprises a tape 1 having a forward edge **1*a*, a row of spaced scoops 5 having rear portions 5*a* secured to the edge 1*a* and forward portions 5*b* extending beyond said forward edge, a pair of cover members 2, 3 adjacent to the opposing sides of tape 1, each cover member overlapping and substantially concealing one side of the scoops 5 and each being folded over itself to form a fold 2*c*, 3*c* extending along and adjacent to the forward portions 5*b* at the opposing sides of the scoops, each cover member comprising an inner layer (between edges 2*a*, 3*a* and folds 2*c*, 3*c*, respectively) adjacent to one side and having a free edge 2*a*, 3*a*, respectively, adjacent to the rear portions 5*a* of the scoops and an outer layer (between folds 2*c*, 3*c* and edges 2*d*, 3*d*, respectively) adjacent to and extending beyond the edges 2*a*, 3*a* of the respective inner layers, and stitch means including at least one row of stitches 4*a*, 4*b* passing through the spaces 5*c* between the forward portions 5*b* of the scoops for connecting cover members 2, 3 to each other and for holding same against the opposing sides of scoop 5, at least one row of stitches 6 adjacent to the rear portions 5*a* of the scoops for securing the inner layers of covers 2, 3 to the tape, and at least one row of stitches 8, 9 for securing the outer layers of cover members 2, 3 to the tape 1**.

FIGS. 5 and 6 show a fully assembled slide fastener consisting of two stringers S and of a slider 11. As can be observed in FIG. 6, the interlocking stitches 4*a*, 4*b* do not pass through the material of tape 1 but interlock in the spaces 5*c* between the adjacent scoops 5. The purpose of these stitches is to prevent separation of covers 2, 3 from the respective sides of the scoops, i.e. to insure that no scoop will be exposed when the slide fastener is in stringer-retaining position as shown in the upper half of FIG. 5 and in FIG. 6. These illustrations further show that a complete concealment of the scoops may be brought about by the covers 2, 3 through their forward edges or folds 2*c*, 3*c* do not fully cover the adjacent sides of scoops 5, i.e. despite the fact that a small fragment of the forward portion 5*b* of each scoop remains visible when the slide fastener is in stringer-releasing position (see the lower part of FIG. 5). This is due to the fact that, when in interlocking position, the forward portions 5*b* of the scoops on one stringer S extend into the spaces 5*c* between the forward portions 5*b* of scoops on the complementary stringer, and vice versa. If the forward edges or folds 2*c*, 3*c* would extend all the way to the free or outer ends of scoop portions 5*b*, a deformation of both covers would necessarily occur when a so constructed slide fastener would be in stringer-retaining position. Thus, the location of folds 2*c*, 3*c* is so calculated that they abut with the corresponding folds of the covers on the complementary stringer when the slide fastener is in stringer-retaining or closed position (see FIG. 6). Since the stitches 4*a*, 4*b* and 6 are concealed in each finished stringer S by the folded-back portions (i.e. by the inner sides) of covers 2 and 3, and since the zig-zag stitches 9 are hidden in the article in which a so constructed slide fastener is utilized, only the stitches 8 remain visible to an observer's eye.

Figure 7:
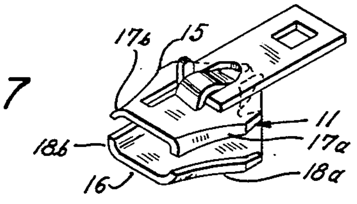
FIG. 7 is a greatly enlarged perspective view of the slider shown in FIG. 5.

With either of the stringers 8 hereinbefore described, a slider is required to bring the forward portions 5*b* of the scoops on complementary stringers into engagement with each other. A slider 11 which is somewhat different from conventional sliders is shown in FIG. 7. It comprises an outer shell or wing 15 and an inner shell or wing 16; these shells surround the opposing sides of the scoops 5 and are adjacent to the outer sides of covers 2, 3 on two complementary stringers S when the slider 11 is caused to move therealong. In addition, the slider 11, comprises upper side portions or flanges 17*a*, 17*b* extending inwardly to the lateral edges of outer shell or wing 15, and similar lower or inner side portions or flanges 18*a*, 18*b* extend inwardly from the lateral edges of the inner shell or wing 16. The purpose of lateral flanges 17*a*, 17*b* and 18*a*, 18*b* is to engage the rear ends of respective scoops 5 and to urge the scoops on complementary stringers into engagement with each other.

As is known, the conventional sliders for slide fasteners are formed with flanges which are disposed in planes at right angles to the planes of respective shells, i.e. normal to the scoops, or they may sometimes lie in a plane which is inclined through slightly less than 90 degrees relative to the outer and inner shells, respectively.

Because the novel slider 11 must travel over the cover members 2, 3 and not directly over the scoops, its flanges 17*a*, 17*b* and 18*a*, 18*b* which, too, pass over the cover members must be inclined through slightly more than 90 degrees relative to the outer and inner shells 15, 16 respectively, i.e. they must form obtuse angles therewith. Thus, the slider 11 for use with the stringers S of the type shown in FIGS. 1 to 6 must be formed with flanges 17*a*, 17*b* and 18*a*, 18*b* all of which are inclined through more than 90 degrees with respect to their shells. Shells 15, 16 of the slider 11 are substantially parallel with each other. By inclination through more than 90 degrees is meant that the flanges 17*a*, 17*b* and 18*a*, 18*b* are inclined outwardly and away from, and form obtuse angles with, the planes of shells 15, 16, respectively, to which these flanges are connected.

Figure 8:
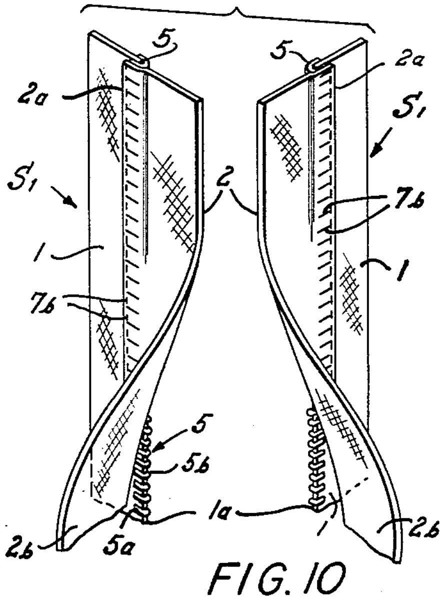
FIG. 8 illustrates in perspective view two partially assembled complementary stringers of modified design, each stringer comprising a single cover member shown attached to the tape and held against one side of the scoops.
Figure 9:
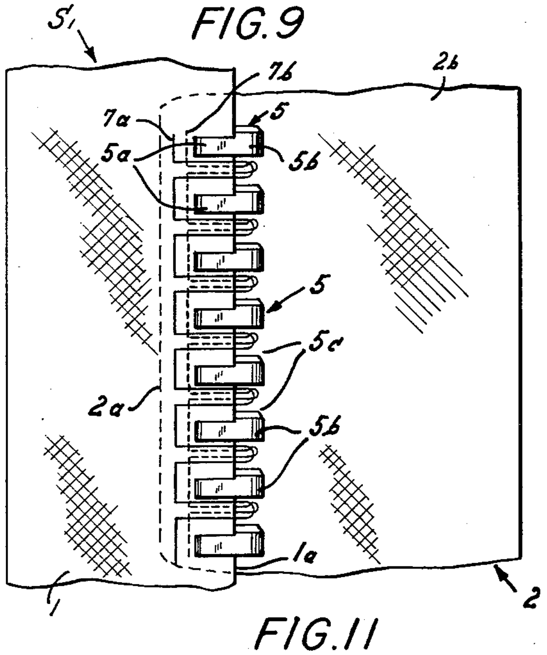
FIG. 9 is a greatly enlarged fragmentary side elevational view of the right-hand stringer shown in FIG. 8, there being shown two rows of stitches which connect the cover member to the tape and hold same against one side of the scoops.
Figure 10:
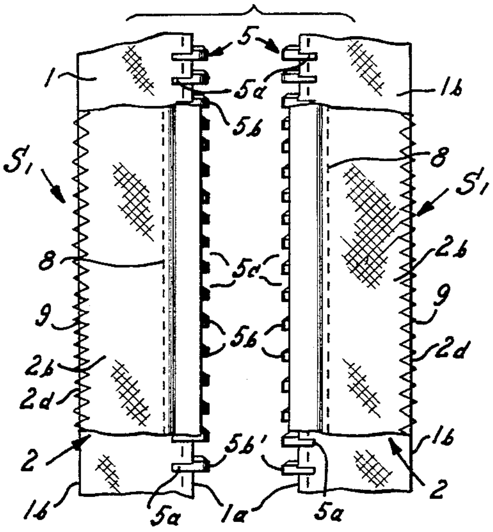
FIG. 10 illustrates the complementary stringers of FIG. 8 in fully assembled condition with their cover members bent or folded over themselves and secured to the intermediate zones as well as to the rear edges of the respective tapes.

If only one side of scoops 5 is to be concealed by a cover member, the manufacture of such stringers will be modified, i.e. simplified, to a certain extent, as is shown in FIGS. 8 to 10. In the first stage which is shown in FIGS. 8 and 9, the outer side 2*b* of the single cover member 2 is turned toward one side of scoops 5 in such manner that the rear edge 2*a* of the cover extends slightly beyond the ends of rear scoop portions 5*a* which are secured directly to the forward edge 1*a* of the tape 1. The cover member 2 is then secured to the tape and held against the adjacent sides of scoops 5 by two rows of preferably U-shaped stitches 7*a*, 7*b*. The thread 7*a* interlocks with the thread 7*b* in the spaces 5*c* between the individual uniformly spaced scoops 5, and it is preferred to interlock the threads in each and every one of spaces 5*c* formed between the adjacent scoops 5. The base or bottom portion of each U-shaped stitch 7*a*, 7*b* is located rearwardly of the rear portions 5*a* of the scoops and secures the cover member 2 to the adjacent flat side of tape 1 (see FIG. 9).

Figure 12:
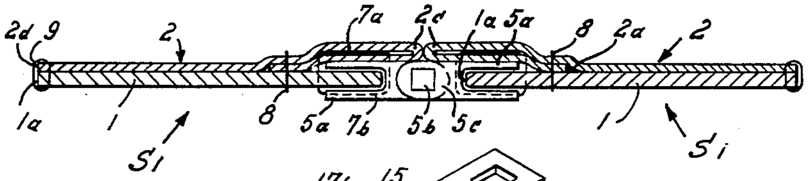
FIG. 12 is greatly enlarged transverse section through the slide fastener taken on the line 12—12 of FIG. 11, as seen in the direction of arrows.

In the next step which is shown in FIG. 10, the cover members 2 of two complementary stringers $S_1$ are folded over themselves to form a forward edge or fold 2*c* adjacent to the free or front ends 5*b'* of the respective scoop portions 5*b*. In this manner, the outersides 2*b* of both cover members become exposed to face an observer looking at that side of each stringer $S_1$ at which the scoops should be concealed when the stringers $S_1$ are coupled with each other. Each cover member 2 is then again secured to the tape 1 by a row of stitches 8, for example, by utilizing the holes formed by the bases of U-shaped stitches 7*a* or 7*b*. However, such overlap of the stitches 8 with the bases of stitches 7*a* or 7*b* is not absolutely necessary and, in fact, not always possible; thus, as can be seen in FIG. 12, the stitches 8 may be located at a distance from the bases of U-shaped seams 7*a*, 7*b*. A row of preferably zig-zag shaped stitches 9 is then applied to the free edges 2*d* of folded-over portions or layers of both cover members 2 to connect same to the rear longitudinal edges 1*b* of respective tapes 1.

Figure 11:
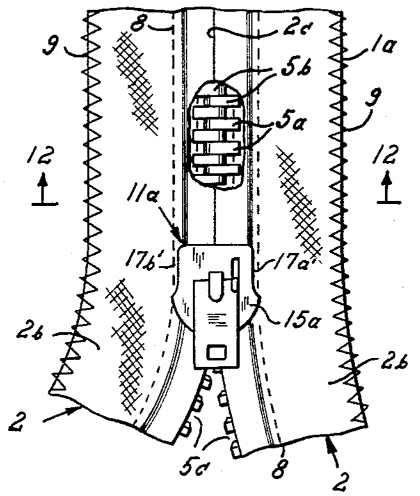
FIG. 11 illustrates a slide fastener comprising the stringers of FIG. 10 and a novel slider, the stringers being shown in partly coupled and partly uncoupled position, a portion of each cover member being broken away to reveal the intermeshing scoops of both stringers.

FIGS. 11 and 12 illustrate a fully assembled slide fastener consisting of two complementary stringers $S_1$ and a slider 11*a* slightly different from that shown in FIG. 7. Thus, since only one side of scoops 5 on both stringers $S_1$ is concealed by cover members 2, only the front or outer flanges 17*a'*, 17*b'* must be inclined with respect to the outer shell 15*a* through more than 90 degrees, i.e. flanges 17*a'*, 17*b'* form obtuse angles with the plane of shell 15*a*. The flanges connected to the non-represented rear or inner shell of slider 11*a* may be disposed at right angles thereto, there being no cover members at the rear sides of stringers $S_1$.

As already described in connection with FIGS. 5 and 6, the position of folds or edges 2*c* on both cover members 2 of the complementary stringers $S_1$ is so selected that these folds come into abutment when the slider 11*a* causes the scoops 5 to intermesh with each other, the cupped forward portions 5*b* of the scoops on one stringer extending into the spaces 5*c* between the scoops on the other stringer and vice versa.

In selecting the material for a cover member, it is preferable that such material should have some elasticity. Especially when fabric is used as the material of a cover member, the portions of the covers 2 and/or 3 adjacent to their respective edges 2*a*, 3*a* which actually conceal the adjacent sides of scoops 5 are preferably cut along the bias to increase the elasticity of the cover members and to thus reduce the resistance to flexing of a so constructed stringer.

Referring now to the embodiment of my invention shown in FIGS. 13 to 26, FIG. 13 illustrates a cover member 20 consisting of a plain ribbon or band of flexible material, such as a textile fabric, plastic, leather or the like, which is utilized to conceal both sides of a series of scoops forming part of a stringer. In the first step, the cover member is folded exactly in half in its longitudinal direction, as is shown in FIG. 14 to form two portions or halves 20*a*, 20*b* connected to each other by a fold 20*c*.

Figures 13, 14, 15, 16:
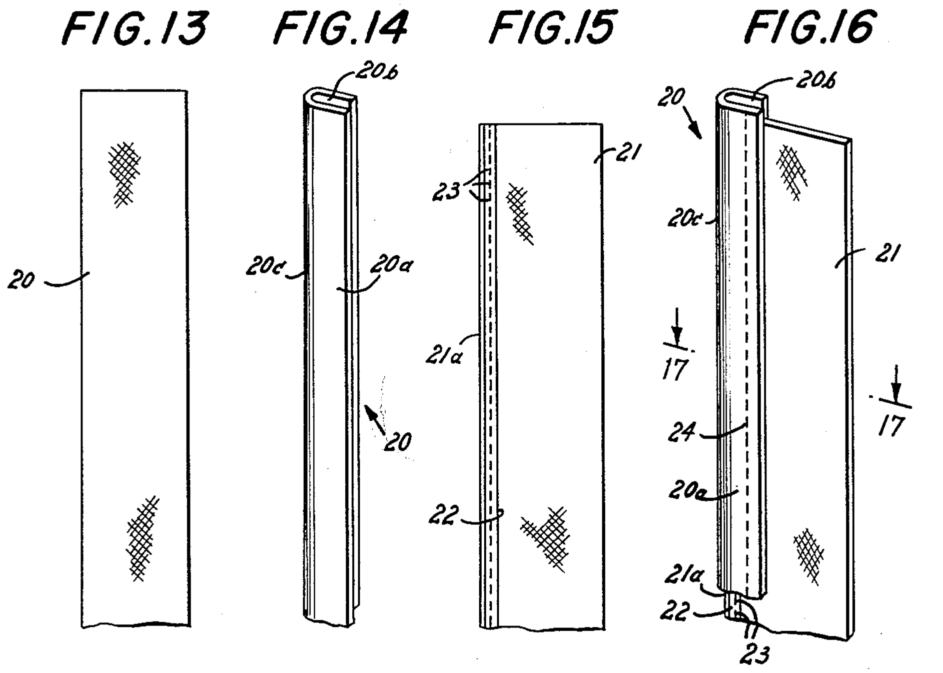
FIG. 13 shows in side elevational view a portion of a cover member.
FIG. 14 shows the cover member of FIG. 13 folded over itself in the longitudinal direction, this cover member being utilized in a further modification of the stringer to cover by itself both sides of a row of scoops.
FIG. 15 illustrates in side elevational view a portion of a tape with two beads applied to its forward edge.
FIG. 16 shows the cover member of FIG. 14 applied to the beaded edge of the tape and secured to the latter by a row of stitches.

A second component of the modified stringer is shown in FIG. 15. It comprises a layer of tape 21 having a forward or front edge 21*a* and carrying two narrow strips 22, hereinafter called beads, which are connected thereto by a row of stitches 23 adjacent to the edge 21*a*. Only one bead 22 is shown in FIG. 15, the other bead being observable in FIGS. 17, 19, 21, 24 and 26. Alternately the beads 22 and stitching 23 may be replaced by a series of strands sewn to the forward edge 21*a* of the tape by a sewing machine.

Figures 18, 20, 23:
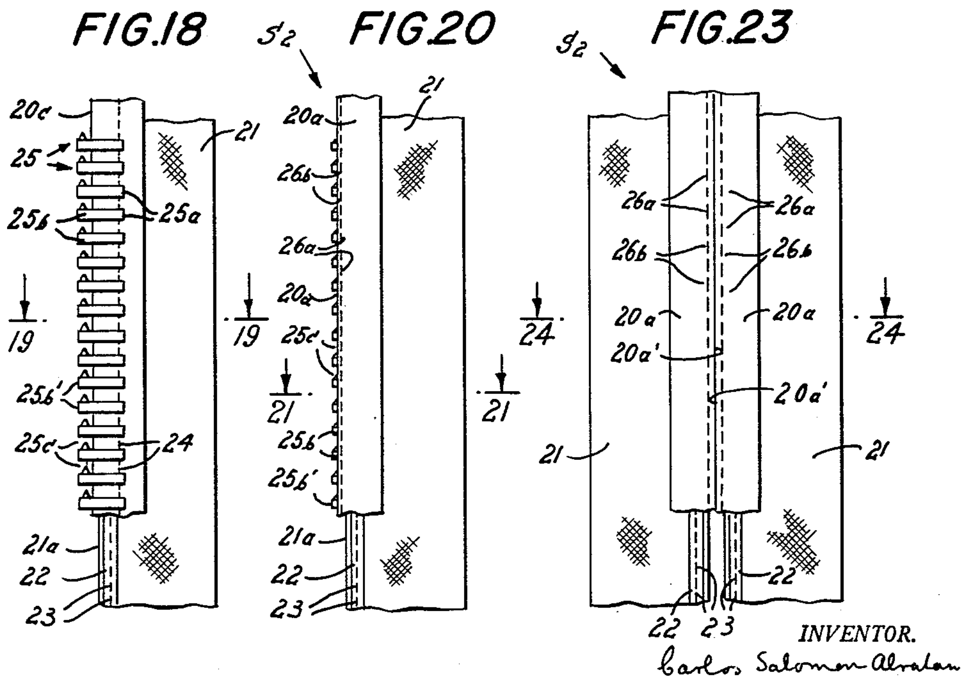
FIG. 18 illustrates the next stage in the assembly of the stringer with a row of spaced scoops applied over the forward edge of the tape and connected with the edge or fold of the folded cover member.
FIG. 20 illustrates the stringer in fully assembled condition, with the halves of the cover member folded over themselves and secured to each other to be held against the opposing sides of the scoops.
FIG. 23 illustrates a fully assembled slide fastener without the slider comprising two coupled stringers of the type shown in FIGS. 20–22, certain portions of the cover members being broken away to reveal the beads on the tapes of both stringers.
Figure 17:
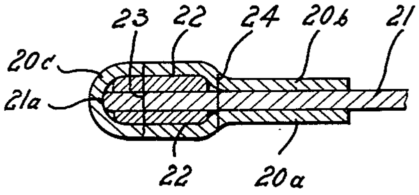
FIG. 17 is greatly enlarged transverse section taken on the line 17—17 of FIG. 16, as seen in the direction of arrows.
Figure 19:
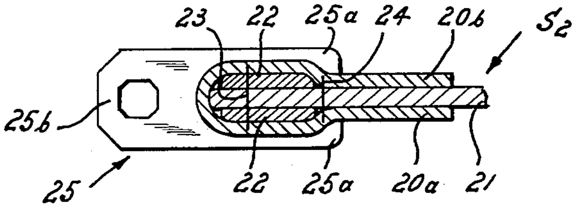
FIG. 19 is greatly enlarged transverse section taken on the line 19—19 of FIG. 18, as seen in the direction of arrows.

In the next step, the beaded forward edge 21*a* of the tape is fully inserted into the space or crease between the cover portions or halves 20*a*, 20*b*, as is shown in FIGS. 16 and 17, and the tape is then secured to both halves of the cover 20 by a row of stitches 24. Stitches or seams 24 are applied at a short distance rearwardly from the beads 22. The zones of cover halves 20*a*, 20*b* between the stitches 24 and the fold 20*c* form with beads 22 and with the forward portion of tape 21 a reinforced support for the rear portions 25*a* of scope 25. The manner in which the scoops 25 are applied in spaced relationship over the beaded edge 21*a* of the tape and secured to the fold 20*c* of the once-folded cover member 20 is shown in FIGS. 18 and 19. Thus, the bifurcated rear portion 25*a* of each scoop extends slightly beyond the row of stitches 24 and the cupped forward portions 25*b* of the scoops extend beyond the edge 21*a* and fold 20*c* to form therebetween spaces or gaps 25*c* which receive the forward portions of the scoops on the complementary stringer.

Figure 22:
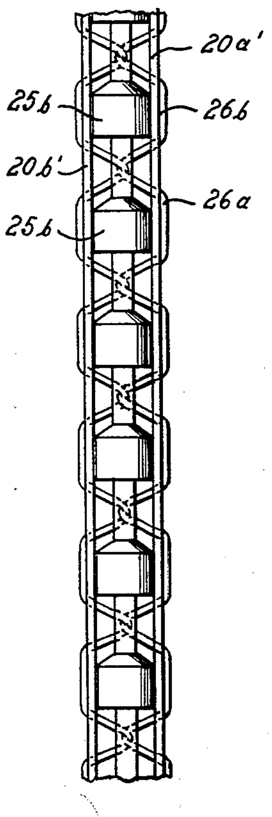
FIG. 22 is greatly enlarged fragmentary front elevational view of the fully assembled stringer shown in FIGS. 20 and 21.
Figure 21:
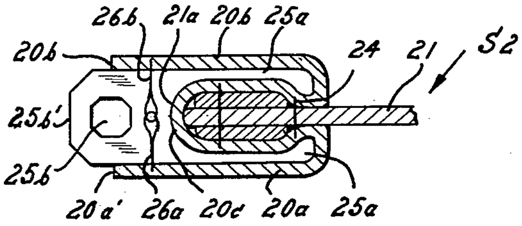
FIG. 21 is greatly enlarged transverse section taken on the line 21—21 of FIG. 20, as seen in the direction of arrows.

A fully assembled stringer $S_2$ is shown in FIGS. 20, 21 and 22. It is formed by again folding both cover portions 20*a*, 20*b* along the row of stitches 24 over the outer sides of rear scoop portions 25*a* and partially over the cupped forward scoop portions 25*b*, i.e. the free edges 20*a'*, 20*b'* of respective cover portions are adjacent to the forward or front ends 25*b'* of scoop portions 25*b*. The cover portions 20*a*, 20*b* are then secured in such position preferably by two rows of stitches 26*a*, 26*b* which pass through and interlock in the spaces or gaps 25*c* between several or all adjacent scoop portions 25*b* close to the fold 20*c*.

Figure 24:
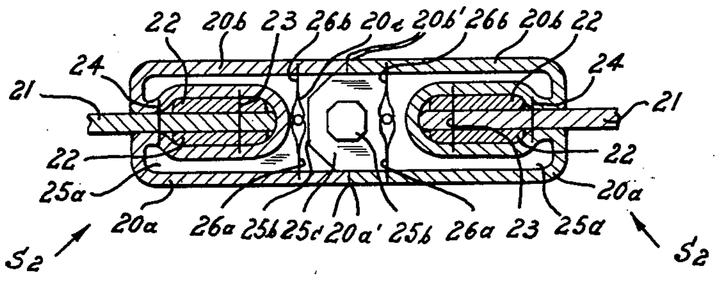
FIG. 24 is greatly enlarged transverse section taken on the line 24—24 of FIG. 23, as seen in the direction of arrows.

A slide fastener consisting of two complementary stringers $S_2$ is illustrated in FIGS. 23 and 24. As can be observed in FIG. 24, the forward portions 25*b* of scoops 25 on the coupled stringers $S_2$ extend into the gaps 25*c*, and the length of each cover member 20 is so selected that its edges 20*a'*, 20*b'* abut against each other to completely conceal the scoops. Since the cover halves 20*a*, 20*b* are again folded over themselves toward the forward or front ends 25*b'* of the scoops, the tapes 21 remain visible; therefore, it may be often desirable to manufacture the tapes and the cover members of the same material dyed to the same color which further reduces the likelihood of detecting that the parts 20, 21 are not integral with each other. It will be noted that the inner side of the cover member 20 is turned outwardly when the cover member is folded in half into the position of FIG. 14. Upon folding of each cover half over the scoops, the real outer side or face of the cover member becomes visible to an observer's eye while the inner side of the cover member remains concealed in a fully assembled stringer $S_2$.

Figure 26:
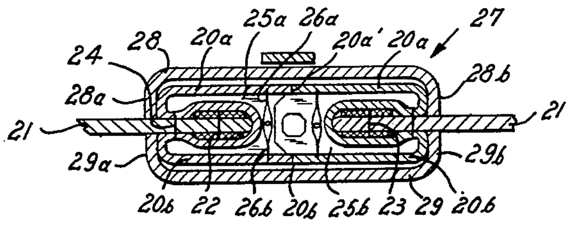
FIG. 26 is greatly enlarged transverse section taken on the line 26—26 of FIG. 25, as seen in the direction of arrows.
Figure 25:
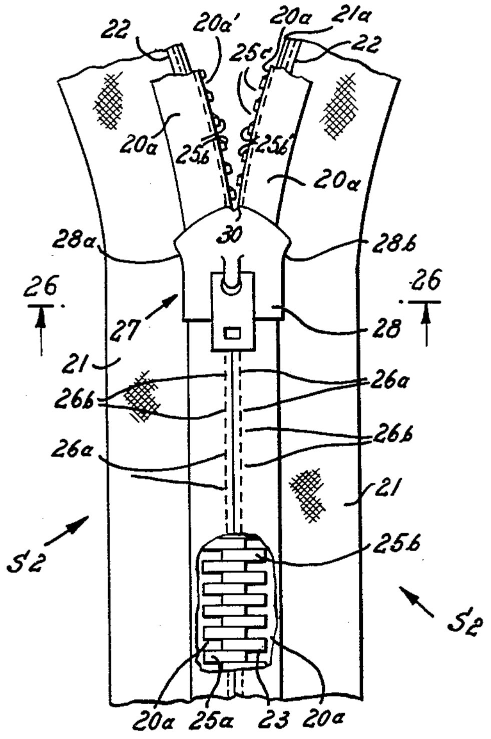
FIG. 25 is front elevational view of the slide fastener shown in FIGS. 23 and 24 with its stringers in partly coupled and partly uncoupled or separated position, and further showing a slider for alternately connecting and separating the stringers.

A slider 27 for the slide fastener of FIGS. 23 and 24 is illustrated in FIGS. 25 and 26 applied to two stringers $S_2$ which are partly coupled with each other as is shown in the lower half of FIG. 25. The slider 27 comprises two substantially parallel shells or wings 28, 29 each formed with two inwardly extending flanges 28*a*, 28*b* and 29*a*, 29*b*, respectively. Since these flanges need not pass over but rather rearwardly of the cover member halves 20*a*, 20*b*, they may extend at right angles with respect to the planes of their respective shells, i.e. the slider 27 may be of a design as presently utilized in conventional slide fasteners. The shells 28, 29 are connected with each other at the upper end 30 of the slider.

An important advantage of the stringers S, $S_1$ and $S_2$ is in that the scoops need no painting to the color shade of the tape 1 or 21 because at least one of their slides is completely hidden by the cover members whenever a slide fastener utilizing such stringers is in closed position, i.e. when the scoops of its stringers intermesh with each other. Excepting for the lines of stitching 8 or 26*a*, 26*b* which become practically nondiscernible at a short distance from the stringers, only the outer sides of the covers are visible since the tape is usually completely embedded in the article on which the slide fastener is utilized. It has been found that in many instances the painting of scoops turns out to be more expensive than the application of cover members in the manner as disclosed hereinabove. In addition, the concealment of scoops in a closed slide fastener by the cover members is complete and permanent in contrast to those utilizing painted scoops since the paint is likely to chip off upon repeated frictional engagement with the slider.

A particular advantage of the stringer $S_2$ shown in FIGS. 20 and 21 is in that the opposing sides of the scoops are covered by a unitary, preferably rather thin cover material, i.e. by one half of cover portions 20*a*, 20*b*, whereas the stringers $S_1$ and $S_2$ utilize two layers of cover material to conceal the scoops. Thus, the two layers of cover member 20 which are applied to the sides of scoops 25 add only slightly to the bulkiness of the stringer $S_2$ by forming two hardly noticeable protuberances at the opposing sides of tape 21 adjacent to the latter's forward edge. In addition, that portion of the cover member 20 which is located between the legs of rear scoop portions 25*a* reinforces the beaded forward edge of the tape at the very point where the tape is exposed to most pronounced wear and tear.

Since the slider 11, 11*a* or 27 runs at least partially over one or two cover members, its movements into stringer retaining or stringer separating positions are practically and frequently absolutely noiseless.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A stringer for a slide fastener comprising, in combination: a tape having an edge; a row of spaced scoops each having a rear portion of a thickness greater than that of said tape and being applied over and connected to the edge of said tape so as to project in transverse direction beyond opposite faces of said tape and each of said scoops having a forward portion extending beyond said edge of said tape; a cover member adjacent to one side of the tape, said cover member being formed from a strip of material cut along the bias, the cover member overlapping and substantially concealing one side of the scoops and said cover member being folded over itself to form a fold extending along and adjacent to the forward portions at one side of said scoops, the cover member comprising an inner layer extending along one side and having a free edge adjacent to and rearwardly of the rear portions of said scoops and an outer layer adjacent to and extending beyond the free edge of said inner layer; and stitch means including at least one row of stitches passing through the spaces between the forward portions of said scoops for holding the inner layer of the cover member against the sides of said scoops, said row of stitches being covered by said outer layer of said cover member, at least one row of stitches located rearwardly of and adjacent to the rear portions of said scoops for securing the inner layer of the cover member to the tape, said latter row of stitches being also covered by said outer layer, and at least one row of stitches for securing at least the outer layer of said cover member to the tape adjacent to said latter row of stitches.

2. A stringer for a slide fastener as set forth in claim 1, wherein said stitch means include an additional row of stitches for securing the free edge of the outer layer of said cover member to the rear edge of said tape.

3. A stringer for a slide fastener as set forth in claim 2, wherein said additional row of stitches is a row of zig-zag stitches.

References Cited in the file of this patent

UNITED STATES PATENTS

| | | |
|---|---|---|
| 2,021,098 | Craig | Nov. 12, 1935 |
| 2,060,830 | Silberman | Nov. 17, 1936 |
| 2,067,734 | Silberman | Jan. 12, 1937 |
| 2,145,552 | Marinsky | Jan. 31, 1939 |
| 2,155,795 | Markin | Apr. 25, 1939 |
| 2,210,547 | Hoffman | Aug. 6, 1940 |
| 2,316,787 | Gould | Apr. 20, 7943 |
| 2,623,214 | Yaffe | Dec. 30, 1952 |

FOREIGN PATENTS

| | | |
|---|---|---|
| 561,073 | Belgium | Oct. 15, 1957 |
| 418,130 | Great Britain | Oct. 19, 1934 |
| 211,106 | Switzerland | Nov. 1, 1960 |